INVENTOR.
JOSEPH MASERJIAN

United States Patent Office 3,456,112
Patented July 15, 1969

3,456,112
TEMPERATURE SENSITIVE CAPACITOR DEVICE
James E. Webb, Administrator of the National Aeronautics and Space Administration, with respect to an invention of Joseph Maserjian, 11159 McVine Ave., Sunland, Calif. 91040
Filed Apr. 18, 1967, Ser. No. 632,162
Int. Cl. G01t 1/16; H01g 7/04
U.S. Cl. 250—83        11 Claims

ABSTRACT OF THE DISCLOSURE

A capacitor-like thermal or infrared radiation detector comprising a sandwich of two metal electrodes with a thin film of material between them which displays dielectric properties in zones near the electrodes, the film having a thickness on the order of magnitude of the free paths of electrons therein, i.e. about 100 A. to 200 A. The film contains a relatively high percent of ionized impurities. The detector has low noise characteristics and its capacitance varies greatly with temperature at low voltages.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

FIELD OF THE INVENTION

This invention relates to thermal detectors and more particularly to a novel detector in the form of a capacitor with a very thin film between the electrodes.

PRIOR ART

Thermal detectors of high sensitivity are used for detecting infrared rays and in other applications. One type of detector is a resistive bolometer which is usually a thin film resistor with large temperature coefficient. The sensitivity of such detectors is largely limited by Nyquist noise and the power dissipation as current flows through the device. Other sensitive detectors such as thermistors whose sensitivity is limited primarily by Nyquist noise, thin film thermopiles whose sensitivity is largely limited by amplifier noise, and Golay cells whose sensitivity is limited primarily by vibrations, all have sensitivities of the same order of magnitude as the resistive bolometer. One type of detector, the superconductng bolometer, has a threshold sensitivity somewhat better than the other devices mentioned above, but it requires cryogenic refrigeration and precise temperature control, giving rise to complications which limit its usefulness.

The development of rugged and simple thermal detectors would be of great usefulness. The best presently available thermal detectors adapted to spacecraft use are thin film thermopiles which can detect black body radiation only from surfaces having temperatures of at least 150° K. In order to detect temperatures on the dark side of the moon, which are believed to be on the order of 90° K., the polar region of Mars which are believed to be 120° K., as well as other relatively cold planetary surfaces, it is necessary to provide thermal detectors having better threshold sensitivity. Many other applications would benefit by the availability of such devices.

SUMMARY OF THE INVENTION

Accordingly, one object of the present invention is to provide thermal detectors having very low threshold sensitivity, i.e. high signal-to-noise ratios when detecting very low radiation levels, and which are of simple and rugged design.

Another object of the present invention is to provide a sensitive radiation detector having a capacitance which varies substantially with temperature and which has high signal-to-noise ratios when detecting low value radiation.

Yet another object of the present invention is to provide a sensitive, fast response thermal detector.

The foregoing and other objects are realized in the present invention by a device comprising a sandwich of two electrodes with a very thin film between them which can display dielectric properties. The film has a thickness of at least the order of magnitude of the quantum-mechanical penetration depth of electrons from the metal electrodes, and for a titanium dioxide material the film is generally no more than a few hundred angstroms thick. The film contains a high level of ionized impurities typically at least a tenth one one percent. In the case of a sandwich having aluminum electrodes with a titanium dioxide film between them, a maximum of a few percent of ionized aluminum oxide or oxygen vacancy impurities can be dispersed from the electrodes into the titanium dioxide automatically in the process of fabrication.

The above device is a capacitor which, at low voltages such as approximately one volt or less between the electrodes, exhibits a capacitance which varies greatly with temperature. While the leakage of the capacitor is relatively high as compared with the usual type of titanium dioxide capacitor, relatively little power is dissipated in the device and the Nyquist noise is very low. The change in capacitance can be measured, as by a bridge circuit, to detect the temperature change of the device, the signal-to-noise ratios being found to be generally best for frequencies of about 1 kc. to 100 kc. The device, which is of low mass, is especially useful in detecting low levels of infrared radiation.

A better understanding of the invention may be had from the following detailed description and claims and the accompanying drawings.

DETAILED DESCRIPTION OF A PREFERRED EMBODIMENT

Figure 1:
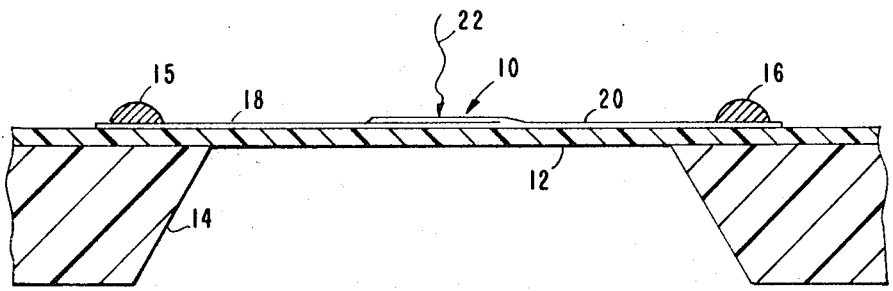
FIGURE 1 is a partial sectional view of a radiation detector having a detection element constructed in accordance with the invention.

FIGURE 1 illustrates a detecting cell constructed in accordance with the invention comprising a thermal detector or "thermactor" 10 disposed on a thin base 12 of electrically and thermally insulative material. The base 12 extends across a hole in a mechanical frame 14 which is much thicker than the base but which has approximately the same thermal expansion coefficient. First and second thin film leads 18 and 20 elecerically connect the thermactor 10 to the first and second external lead connections 15 and 16. The thermactor 10 has a capacitance which varies with temperature. Alternating currents are conducted to the thermactor through the connections 15 and 16 and the leads 18 and 20 in order to detect changes in its capacitance. Such detections can be made by connecting leads from connections 15 and 16 across one arm of a bridge circuit using apparatus and techniques well known in the art.

When radiation such as infrared rays indicated by the arrow 22 strike the thermactor 10, the temperature of the thermactor rises and its capacitance changes. The measurement of the change in capacitance yields a measurement of the radiation striking the thermactor.

Figure 2:
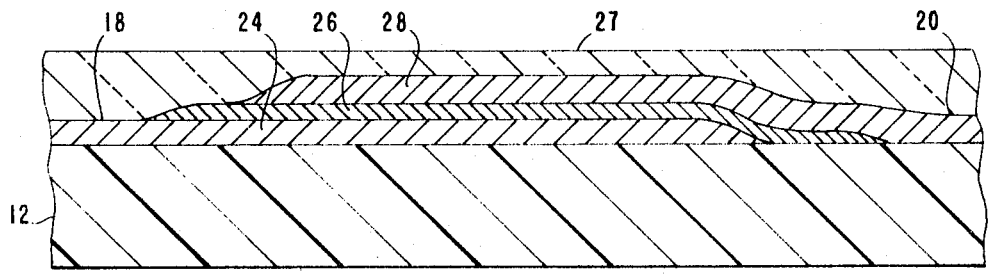
FIGURE 2 is an enlarged sectional view of the thermal detector of FIGURE 1.

A more detailed view of the thermactor 10 of FIGURE 1 is shown in the highly magnified illustration of a thermactor presented in FIGURE 2, in which the dimensions are distorted to facilitate clarity of illustration and understanding, and in which the vertical dimensions in particular are greatly exaggerated. The thermactor comprises a first electrode 24 of aluminum disposed on the thin base 12, a very thin film of titanium dioxide 26 disposed on the first electrode and a second electrode 28 of aluminum disposed on the thin film. A protective coating 27 of transparent aluminum oxide, $Al_2O_3$ covers the thermactor. The first and second leads 18 and 20 are formed integrally with the first and second electrodes 24 and 28. The slightly separated electrodes 24 and 28 serve as a capacitor and the thin film 26 between them results in a large capacitance. The peculiar nature of the film 26 causes a change in capacitance with temperature of the termactor, the change being much greater than the change in dielectric constant of the film, and this change in capacitance enables the device to be used as a radiation detector capable of detecting extremely low levels of radiation.

The functioning of the device as a thermal detector requires that the film 26 be extremely thin, and it is also generally necessary that the film contain a high percent of ionized impurities. For a film of evaporated titanium dioxide the film thickness should be no more than a few hundred angstroms (i.e. no more than about 300 A.) to prevent serious degradation of operation of the device as a thermal detector, because if thicker films are used, capacitance will not change as much with temperature. It is also generally necessary for the film to be at least about 70 A. in thickness, to keep leakage currents to an acceptable level. Evaporated titanium dioxide films having thicknesses between approximately 100 A. and 200 A. have been found to provide thermal detectors of excellent characteristics.

In order for the device to function as a thermal detector, it is also generally necessary that the film contain ionized impurities in a density averaging at least about one-tenth mole percent throughout the film. In the case of evaporated titanium dioxide film, ionized aluminum dioxide impurities or oxygen vacancies (absence of oxygen atoms which results in adjacent titanium atoms sharing fewer electrons) in the film constituting as much as a few mole percent of the material enables functioning of the device as a good thermal detector. As will be noted below, the impurities in the film appear to be introduced automatically during the evaporative deposition of the film. The aluminum electrodes 24 and 28 do not have a critical thickness, but evaporatively deposited aluminum films of approximately 300 A. thickness have been found satisfactory.

It is instructive to note the difference between the thermactor, or thermal detector, of this invention and normal titanium dioxide capacitors which they somewhat resemble. Titanium dioxide capacitors generally have dielectric films in excess of 1000 A. and are produced with a minimum of impurities. If they have substantial impurities, they are considered leaky and are rejected. Thin film structures satisfying the general requirements of this invention would normally be considered very poor capacitors for usual capacitor applications. They would be limited to very low working voltages, such as one volt, and would exhibit excessive leakage.

Thermal detectors have been constructed in accordance with the present invention by both evaporation of titanium dioxide and anodization of films of titanium, using evaporated electrodes of both aluminum and gold. The thermactors constructed with evaporated aluminum electrodes and evaporated titanium dioxide films were found to possess the best stability and most constant characteristics for different samples, and the fabrication of such detectors will be described with sufficient detail to give an appreciation of the steps involved.

The fabrication of evaporatively produced thermactors has been accomplished by a sequence of evaporations in vacuum and certain low pressure gases. The sequence of operations included the cleaning of the substrate, or base, and the materials to be evaporated before loading into the vacuum system, vacuum outgassing the loaded system, evaporating a first metal contact on the substrate, depositing the titanium dioxide film on the first contact, evaporating a second metal contact on the titanium dioxide film, and evaporating an aluminum oxide protective film on the device.

Thermactors have been made using a base or substrate of freshly cleared mica approximately 1000 A. thick which was bonded to a much thicker titanium or mica frame and which was immediately placed in the vacuum chamber. The loaded system was outgassed in vacuum at approximately 150° C., and pumped to a vacuum of less than $3 \times 10^{-8}$ torr.

The evaporations were performed by electron beam bombardment by moving the appropriate source (aluminum or titanium dioxide) into the target position of the electron beam while locating the other source material out of the way. The aluminum electrodes of the thermal detector were deposited during a period of a few seconds, using a shutter and a thickness monitor to obtain film thicknesses of the order of 300 A. During this evaporation, the vacuum was held to about $10^{-6}$ torr.

The oxide films were deposited by slowly evaporating rutile crystal ($TiO_2$) in the presence of pure oxygen at a pressure of $2 \times 10^{-4}$ torr. The oxygen gas being metered into the system during this evaporation serves to replace the oxygen which dissociates from the $TiO_2$ at the temperature of about 1700° C. required for evaporation. A slow deposition rate of approximately 0.2 A. per second was maintained to allow the oxygen gas time to react with the dissociated molecules being deposited on the aluminum electrode and thus form a nearly stoichiometric composition of $TiO_2$ in the film.

After depositing the second aluminum film, a protective film of $Al_2O_3$ was evaporated in vacuum over the thermal detector to a thickness of about 200 A. This film serves to protect the device from atmospheric moisture during storage and is believed to have insured greater reproducible results.

The evaporations were made through shutters which were opened after a steady evaporation rate was maintained, and through masks which were positioned over the substrate to control the shape of the various depositions. The masks were separated from the substrate by approximately $\frac{1}{16}''$ to give relatively diffuse edges to the evaporated patterns. This was believed necessary to avoid appreciable variations in the thickness of the oxide film at the edges of the metal contacts, and thus to assure more predictable characteristics.

Thermal detectors constructed in accordance with the above of either square or circular shape with areas from $1 \times 10^{-4}$ to $2 \times 10^{-3}$ cm.$^2$ were tested at various voltages, frequencies, and temperatures. For alternating currents of about 0.5 volt and frequencies between 10 and 100 kc., the devices had capacitances of approximately $3 \times 10^{-6}$ farrads/cm.$^2$ and equivalent parallel resistances on the order of 50 ohm–cm.$^2$. The temperature coefficients of capacitance had values of approximately .002 to .004 per degree K. between 78° K. and 300° K., which is a coefficient range comparable to the temperature coefficient of resistance of metal film bolometers. However, an important advantage of the thermal detectors of this invention over bolometer detectors is that the response to temperature change is a change in reactance rather than resistance. The present device can have a relatively small resistance compared to its capacitive reactance and the Nyquist noise which is generated in only the dissipative part of the device, and which is the main limitation on the threshold sensitivity of bolometers, is at a minimum.

The noisiness of the device can be expressed by a quality factor $Q=2\pi f_o RC$, where R and C represent the equivalent parallel resistance and capacitance at the frequency $f_o$ of an applied AC voltage. Q represents approximately the increase in signal-to-noise ratio of the thermactor over devices displaying pure resistance which varies with temperature. The Q of the thermactors constructed in accordance with the foregoing have been measured to be as high as 50 in the frequency range of 10 to 100 kc.

While the quality factor Q is a good comparison of the thermactor with resistive devices, perhaps the most commonly used figure of merit for comparing different thermal and quantum detectors is the detectivity D*. D* is defined as the reciprocal of the noise-equivalent-power, NEP, for a unit bandwidth and unit area of a device. In general, this can be expressed by $$D^* = \sqrt{A\Delta f}/NEP \qquad (1)$$

where A represents the area of a device, $\Delta f$ represents the frequency bandwidth of the detected signal, and NEP is the incident radiation power required to make the signal-to-noise ratio of the detector equal to unity. An upper thoretical limit on D* for thermal detectors is reached when the source of noise output is dominated by the random exchange of photons between the detector and its environment. At an operating temperature of 295° K., this limit is $D_{max} = 2 \times 10^{10}$ cm. (c.p.s.)$^{½}$/watt. The thermactors of the present invention begin to approach this theoretical limit of D*. In addition, they have a frequency response of approximately ten cycles per second for the small sizes constructed above, are rugged, can be used with simple circuitry, can be readily adapted to imaging arrays, and make extremely sensitive detectors for infrared radiation and in other uses.

Figure 3:
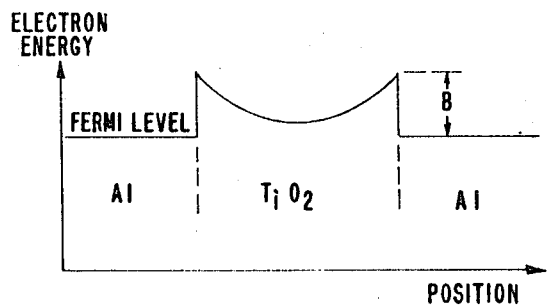
FIGURE 3 is an idealized energy-position diagram showing the potential energy believed to exist at various positions along the thickness of the devices of the invention shown in FIGURES 1 and 2.

An explanation of the characteristics of the thermactors may be given by considering the potential energy at various points along the thickness of the material as given in the diagram of FIGURE 3. The figure shows the potential energy required for an electron or its theoretical opposite, a hole, to enter the potential barrier from the aluminum electrode. The potential energy, indicated in the diagram as electron energy, remains constant at the Fermi level up to the aluminum-titanium dioxide interface. The potential barrier B at the interface is ideally equal to the difference between the titanium dioxide work function and the aluminum work function. The introduction of impurities in titanium dioxide film provides a large ionic space charge (in the example considered a net positive space charge is required) which causes the potential barrier in the titanium dioxide dielectric to be reduced at the center portion thereof a level close to the Fermi level of the aluminum. The deep valley in the potential barrier of the titanium dioxide dielectric film permits electrons to quantum-mechanically tunnel through that portion of the barrier which separates the aluminum electrode from the interior of the dielectric.

At sufficiently low applied voltages, the conduction process is strongly thermally assisted so that the effective barrier decreases as temperature increases. Correspondingly, the capacitance increases with temperature because of the narrowing of the effective width of the potential barrier. This variation of capacitance with temperature is on orders of magnitude larger than that due to a change in the dielectric constant. It may also be noted that conductance also increases with temperature at low voltages and adds slightly to the response. This large change in capacitance with temperature enables the device to be used as a very sensitive thermal detector.

Measurements of the thin film titanium dioxide space charge density (due to impurities) show that it varies from approximately 100 coulombs/cm.³ at the aluminum-dielectric interface to the order of 1 coulomb/cm.³ in the interior. This ionic space charge is believed to arise either from the introduction of aluminum dioxide acceptors, $(AlO_2)^-$ by the aluminum electrodes or the introduction of oxygen vacancies; a similar result can be expected with the introduction of other impurities. The introduction of the impurities can take place both during and after the evaporation processes. Various materials such as gold electrodes instead of aluminum, and various processes such as the anodizing of thin film titanium dioxide have been used. However, the evaporatively deposited aluminum and titanium dioxide sandwiches have have been found to possess the most stable and predictable characteristics of the various types fabricated. Variations in the process have been resorted to and it is found that one variation, the moderate heating of the substrate (e.g. to 150° C.) prior to and during the evaporation process, results in better stability.

Figure 4:
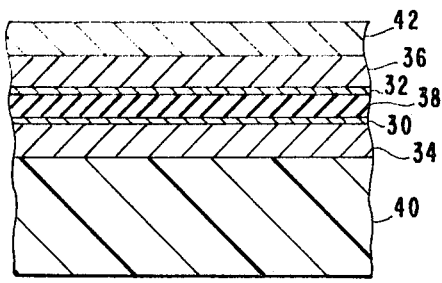
FIGURE 4 is an enlarged sectional view of another embodiment of the invention.

Another embodiment of the invention, illustrated in the sectional view of FIGURE 4, displays especially good response characteristics. In that embodiment, two layers of $Al_2O_3$ designated 30 and 32, are disposed between each electrode 34 and 36 and the layer 38 whose dielectric properties are utilized to provide capacitance. As in the embodiment shown in FIGURE 2, the thermactor device is situated on a base 40 and is covered by a protective layer 42 of $Al_2O_3$. The layers of aluminum oxide 30 and 32 are evaporatively deposited to a thickness of approximately 20 A. on the aluminum electrode 34 and titanium dioxide layer 38, respectively. The aluminum oxide layers 30 and 32 must be very thin, less than the thickness of the titanium oxide layer, to provide improvement. Such improvement results because the aluminum oxide layers increase the height of the potential barrier near the electrodes. As the thickness of the layers 30 and 32 increases, the Q factor, described above, increases and allowable voltage increases, but temperature coefficient decreases. The response of the device (change of output for given change of temperature) is proportional to the product of Q, temperature coefficient, and applied voltage, and there is an optimum of approximately 20 A. for many applications.

While titanium dioxide films of thicknesses on the order of a few hundred angstroms or less having high concentrations of ionized impurities, which are deposited between electrodes, have been found to display excellent thermactor characteristics, it should be understood that other materials which can display dielectric properties can be used. A requirement for good thermactor characteristics is that the film whose dielectric properties are utilized to provide capacitance have sufficiently large ionic space charge due to impurities to cause the potential barrier to approach the Fermi level at the interior of the film, and that the film be sufficiently thin that the interior region does not have a serious effect on the capacitance of the device. That is, the capacitance in an ideal case should result only from the contribution of that portion of the barrier adjacent to the two electrodes, with the interior region introducing a minimum of resistance to the current. A very thin film is required in order to minimize the resistive losses of the interior region of the film whose dielectric properties are utilized as well as to insure that the interior does not introduce so much capacitance as to substantially mask the highly changeable capacitance.

While a particular embodiment of the invention has been described in detail, many modifications and variations therein may be resorted to without departing from the teachings of the invention, and the scope of the invention is limited only by a just interpretation of the following claims.

What is claimed is:
1. A thermal sensing element comprising:
a pair of electrodes; and
a film of a material capable of displaying dielectric properties disposed between said electrodes, said film having impurities of about one-tenth mole percent for establishing potential energy barriers in said material which change from a value substantially different from the Fermi value of the electrodes at the interface therewith to a value approaching said Fermi level at interior regions of the film, said film having a thickness range wherein the potential barrier of interior regions thereof which are close to said Fermi level are no more than several times as thick as regions having potential barriers substantially different from said Fermi level, to provide for a change in capacitance dependent primarily upon change in width of potential barriers in said film with change in temperatures.

2. A thermal detector as defined in claim 1 wherein: said film has a thickness between about 70 A. and 300 A.

3. A thermal detector as defined in claim 1 wherein: said film is composed of titanium dioxide and has a thickness of no more than about 300 A.

4. A thermal detector as defined in claim 3 including: a layer of $Al_2O_3$ having a thickness on the order of magnitude of 20 A. disposed between each electrode and said film.

5. A thermal detector as defined in claim 1 wherein: said electrodes are constructed of aluminum; said film is composed of titanium dioxide having a thickness ranging approximately between 100 A. and 200 A., and the ionized impurities therein are primarily $(AlO_2)^-$ acceptors.

6. A thermal detector as defined in claim 1 wherein: said film is composed of titanium dioxide having a thickness of between approximately 100 A. and 200 A., and includes oxygen vacancy impurities.

7. A thermal detector as defined in claim 1 wherein: said film is an evaporatively deposited film having a thickness of no more than several hundred angstroms.

8. A thermal detector comprising:
a pair of electrodes; and
a film of titanium dioxide between said electrodes, said film having a thickness of less than 200 A. and having impurities of about one-tenth mole percent.

9. A thermal detector as defined in claim 8 including: a layer of $Al_2O_3$ having a thickness no greater than approximately 70 A. disposed between each electrode and said titanium dioxide film.

10. A thermal detector as defined in claim 9 wherein: said layers are evaporatively deposited layers having thickness of approximately 20 A.

11. A thermal detector as defined in claim 8 including: impurities distributed in said dielectric film producing an ionic space charge density on the order of magnitude of 100 coulombs per cubic centimeter at the interface between said film and said electrodes and on the order of magnitude of one coulomb per cubic centimeter at regions at the center of said film.

References Cited
FOREIGN PATENTS
710,079   6/1954   Great Britain.

RALPH G. NILSON, Primary Examiner

M. J. FROME, Assistant Examiner

U.S. Cl. X.R.

73—355, 362; 250—83.3; 317—246, 247